RANGE OPEN DOOR LATCHING DEVICE

Original Filed Aug. 9, 1967 2 Sheets-Sheet 1

INVENTOR.
WILLIAM R. GUY
BY Carl J. Barbee
Albert Katla
ATTORNEYS

RANGE OPEN DOOR LATCHING DEVICE

Original Filed Aug. 9, 1967 2 Sheets-Sheet 2

INVENTOR.
WILLIAM R. GUY
BY Carl J. Barber
Albert Laita
ATTORNEYS

United States Patent Office

Re. 27,545
Reissued Jan. 9, 1973

27,545

RANGE OPEN DOOR LATCHING DEVICE

William R. Guy, Grand Rapids, Mich., assignor to Kelvinator, Inc., Cleveland, Ohio Original No. 3,462,584, dated Aug. 19, 1969, Ser. No. 659,348, Aug. 9, 1967. Application for reissue Aug. 13, 1971, Ser. No. 171,481
Int. Cl. F27d *11/02*
U.S. Cl. 219—412 10 Claims

Matter enclosed in heavy brackets [ ] appears in the original patent but forms no part of this reissue specification; matter printed in italics indicates the additions made by reissue.

ABSTRACT OF THE DISCLOSURE

A latching device for a range oven door operated by an electric motor which also actuates circuit control switches of which one controls the motor and another the circuit to the oven heating elements for elevating the temperature in the range oven to effect a self cleaning thereof by the principle of pyrolysis.

The present invention relates to door latching arrangements for range cooking ovens and more particularly to a latching device being operative for use only during non-cooking periods when it is desired to elevate the temperature within the cooking oven to above normal cooking values so as to effect a degrading of food soils adhering to the walls of the oven chamber by utilizing the principle of pyrolysis.

An object of the present invention is to provide a latching device for range oven doors which is fully automatic in operation requiring no manually moved lever, or manual prelatching or unlatching, to effect a locking or unlocking of the oven door.

Another object of the present invention is to provide a latching arrangement whereby the door is automatically latched upon the presetting of the heat control to effect a self cleaning operation to degrade the food particles from the oven walls to automatically unlatch the door upon the heat controls being set for normal cooking needs.

A further object of the present invention is to provide in circuit with a motor operating a latching and unlatching mechanism for range oven doors a switch thermostatically controlled in response to the temperature within the oven chamber to prevent unlatching during periods the temperature is being elevated above normal cooking needs.

A still further object of the present invention is to arrange a motor to operate a latching device for a range oven door together with circuit control switches of which one controls the motor and another a heating circuit.

These and other objects and advantages to be gained in the practice of this invention will be better understood and further appreciated upon the reading of the following specification having reference to the accompanying drawings.

Figure 1:
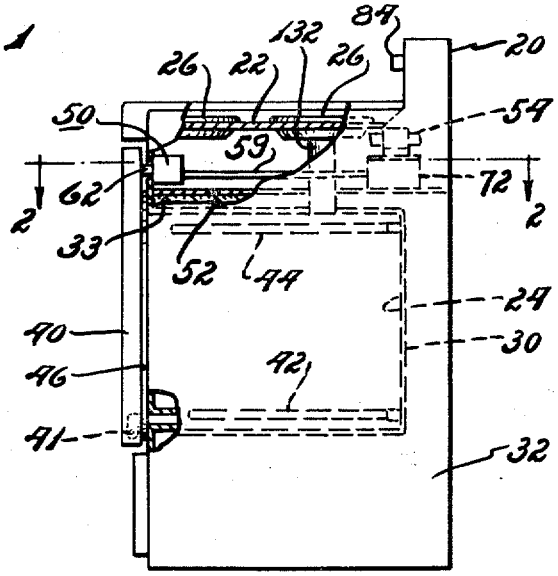
FIG. 1 is a side elevational view of an electric range with parts broken away and parts shown in section and embodying my door latching device.
Figure 5:
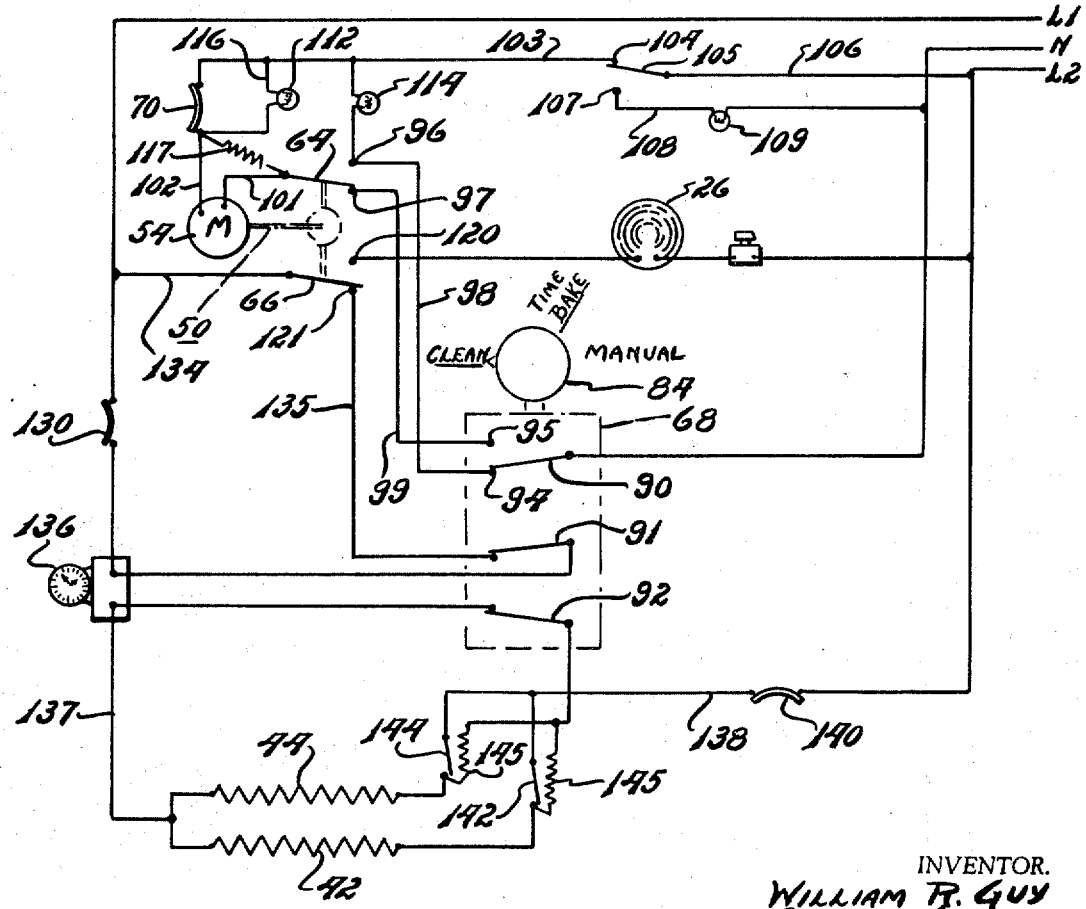
FIG. 5 is a wiring diagram illustrating the control circuit for the present invention and as incorporated in a range circuit for controlling the high heat self cleaning oven operation.
Figure 2:
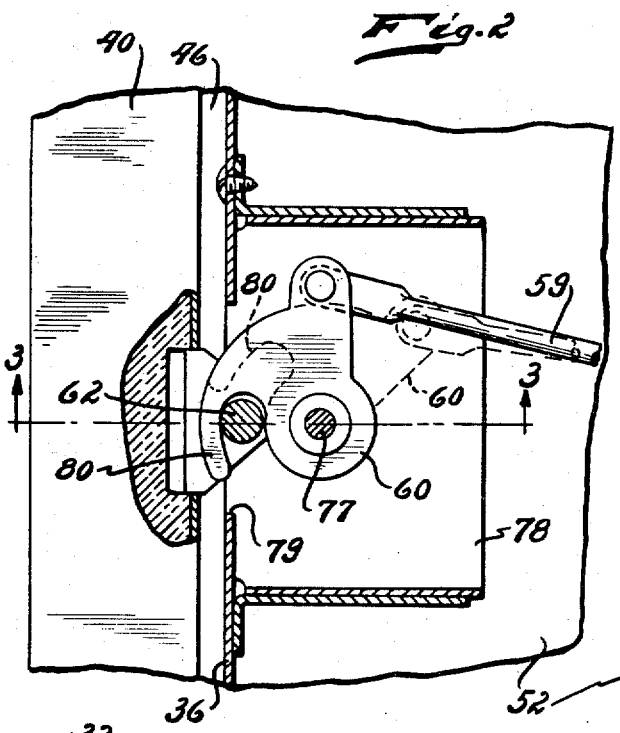
FIG. 2 is a fragmentary sectional view taken along line 2—2 of FIG. 1 illustrating the door latching device.
Figure 2:
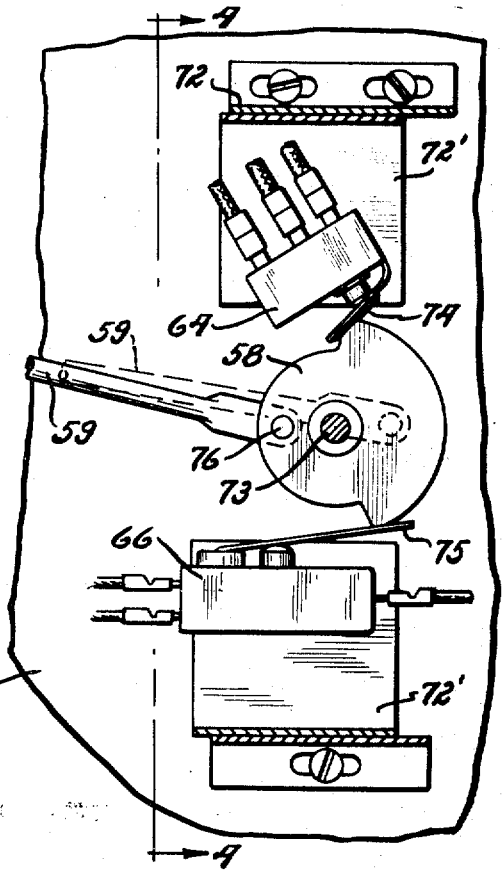
Figure 3:
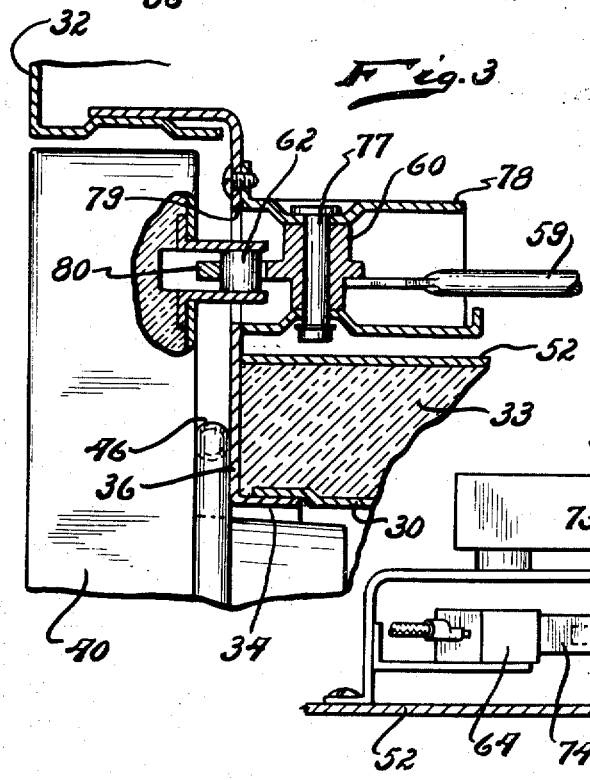
FIG. 3 is a sectional view taken along line 3—3 of FIG. 2.
Figure 4:
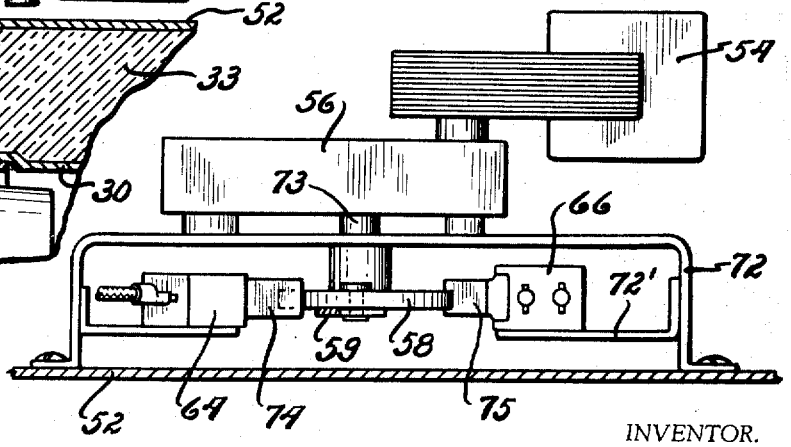
FIG. 4 is an elevational view of the motor drive and switch arrangement viewed along line 4—4 of FIG. 2.

Referring to the drawings, the number 20 designates in general a cooking range having a cook top 22 and an oven chamber 24.

Arranged on the cook top are a plurality of surface heating elements 26.

The oven chamber 24 is formed by a boxlike oven liner 30 and is supported in spaced apart relation from the sides, top and bottom walls of outer casing 32 for packing suitable heat insulation 33 therebetween.

Access to the chamber 24 is through an opening 34 formed in front wall 36 of the range and which is closed by a door 40. The door 40 is hinged on a horizontal axis, as at 41, adjacent the bottom edge of the door to swing downwardly to a horizontal position when opened. The hinge arrangement may be one that incorporates a spring to hold it in closed position. It is not here described or shown for the reason that any well known arrangement may be used as the hinge arrangement forms no particular part of the present invention.

The oven chamber is heated by a lower heating element 42 and an upper heating element 44 between which are shelves (not shown) suitably positioned and supported for the placement of food that is to be cooked in the oven chamber.

No latching of the door is required when the oven chamber is in cooking use. The door is held sufficiently shut by the tension of springs incorporated in the hinge arrangement, explained above. Such an arrangement holds the door with sufficient tension to provide a slight compression on a gasket 46 between the door and the front wall 36. The gasket is carried by the door and extends perimetrically about the door opening 34. The gasket 36 may be interrupted in its continuity along the bottom edge of the door to form gaps through which a restricted amount of air may enter the oven chamber.

In utilizing the principle of pyrolysis to self clean the oven walls of adhering food and grease soils the temperature within the oven chamber is elevated to between 750° F. to 950° F. for a predetermined period. As the temperature range is considerably above the normal cooking requirements of 150° F. to 550° F. safety standards require that the door be securely latched and locked against opening during this elevated temperature period. Further, to insure that a uniform temperature is had in all areas of the oven chamber the gasketed section must be drawn up to prevent or minimize air entrance into the chamber except through such gap that may be provided for limited air movement into the oven. By tightly sealing the door the oven walls adjacent the door area cannot be cooled by inflow of cooler room air and so the area remains sufficiently heated to degrade the food soils without the need of additional heaters about the access opening 34.

The latching device of the present invention is indicated in general by the numeral 50 and is located within the range cabinet or body, being mounted on a partitional panel 52 located above the top insulation on the oven liner and being a spatial distance below the cook top 22.

The latching device comprises an electric motor 54 operatively connected to a reduction drive 56 which in turn is connected to drive a cam member 58. A link or rod 59 connects the cam member 58 to a latch member 60 to pivotally swing it into and out of engagement with a keeper 62 carried by the door 42. Associated with the cam member for sequestial actuation thereby are switches 64, 66 each connected in respective circuits to a manually actuated controller 68. The switches 64, 66 are each of the double throw type. The switch 64 is in circuit with the motor 54 and a non-adjustable thermostat switch 70. The thermostat switch 70 is positioned to be responsive to the temperature within the oven chamber and with switch 64, controller 68, forms a control arrangement for the latching and unlatching of the door automatically. The switch 66 controls the circuit to the heating elements 42, 44 during the self-cleaning operation.

The motor 54 is pre-assembled with the reduction drive 56 and is mounted by a bracket 72 to the panel 52. From the reduction drive 56, extends a driven shaft 73 upon which is secured to be driven thereby the cam 58. Engaging against the cam 58 are cam followers 74, 75 arranged to actuate the switches 62, 64 respectively. The switches 62, 64 are supported on arms 72 secured to bracket 70.

Secured by a pin 76 to the body of the cam 58 for carry thereby concentric about the axis of the shaft 73 is one end of the rod 59 whose opposite end is pinned to the latch member 60. The latch member 60 is journaled on a shaft 77 that is secured to a bracket 78. The bracket 78 is attached to the rear face of the front wall 36 and across an opening 79 formed in the front wall through which enters the keeper 62 upon the closing of the door 40.

The latch member 60 is formed with a hook finger 80 to engage the keeper 62 and arranged whereby the finger is slightly eccentric to the axis of the latch member so that as the latching action continues a drawing up of the door to the front wall is had to compress the gasket 46 therebetween.

The manually actuated controller 68 includes a plurality of switches 90, 91, 92 actuated by rotation of a knob 84. The knob is selectively settable in positions of Clean, Time, Bake and Manual. Other switches are found in the controller to control circuits to provide various heating needs in various cooking operations but are here omitted for clarity of the present invention. For further disclosure, reference is made to the application filed by Herbert A. Kauranen, titled "Range Oven Control Circuit for Pyrolytic Oven Cleaning," Serial No. 659,775 which application is assigned to the same assignee as here and filed on Aug. 10, 1967.

The switch 90 is a double throw type and its contacts 94, 95 are connected to respective contacts 96, 97 of the switch 64 by conductors 98, 99 respectively, The switch blade of switch 90 is connected to a power supply line N while the switch blade of switch 64 is connected by conductor 101 to one side of the motor 54 which in turn is connected by conductor 102 to the thermostat switch 70. A conductor 103 connects the thermostat switch 70 to a contact 104 of a double throw door switch 105 whose switch blade is connected by conductor 106 to a power supply line L2. The other contact 107 of the door switch 105 connects by conductor 108 a lamp 109 to the power supply line N. When the door is opened the switch 105 is upon the contact 107 to energize and illuminate the oven chamber. Closing the door moves the switch upon the contact 104.

Signal lamps 112, 114 are provided to indicate the latching of the door and that the circuit for the self cleaning oven period is closed. The signal lamp 112 is connected by a conductor 116 in a shunt circuit to the thermostat switch 70 and in series with the motor 54. The lamp 112 is also connected in shunt to the motor by a resistor 117 in shunt to the motor and in series with the switch blade of the switch 64. The signal lamp 114 is connected across from the contact 96 to the conductor 103.

Knob 84 for normal use of the oven is set on Time, Bake or Manual which places the switch 90 upon the contact 95. If the door is latched this will close the circuit to unlatch the door and reset the switch upon the contact 96 for the period the door is held unlatched. The thermostat switch 70 is influenced by the temperature of the oven and is normally closed while the temperature remains below 575° F. and opens when the temperature is elevated thereabove. The thermostat switch 70, with switch 64 on contact 96, presets the latching circuit so that in setting the knob to Clean, this closes the switch 90 upon contact 94, the motor is immediately energized to effect a latching of the door. The circuit follows from power line N, switch 90 on contact 94, conductor 98, switch 64 on contact 96, motor 54, thermostat switch 70, conductor 103, door switch 105 on contact 104, conductor 106 to power supply line L2.

The drive 56 reduces the motor's rotation to rotate the cam 58 a half revolution to fully latch the door. That is, the cam need travel only 180 degrees for finger 80 to become fully interlocked with the keeper 62 whereupon the motor is then de-energized by the cam actuating the switch 64 from contact 96 to contact 97. With the door latched the switch 64 now presets an alternate circuit to unlatch the door. To unlatch the cam is continued in its rotation for a second half turn, or another 180 degree travel, and upon completion the switch 64 is actuated from the contact 97 back to contact 96 to preset the first or the latching circuit.

Should it be decided not to proceed with the self cleaning operation, or the knob is accidently reset from Clean to either of the other positions, the switch 90 moved upon the contact 95 will either complete or preset the unlatching circuit dependent upon the temperature prevailing within the oven chamber. If it has not risen above 575° F. the door is immediately unlatched as the thermostat switch 70 will still be closed. However, if the temperature has been elevated thereabove the door will not be unlatched until the chamber has cooled to and below 575° F. to effect the reclosing of the thermostat switch 70.

With the operation of the switch 64 the cam 58 also actuates the switch 66 to provide a by-pass circuit to the parallel connected heating elements 42, 44 around the thermostat 130 that normally controls the heating element for normal cooking uses. The switch 66 also disconnects the circuit to one of the surface heating elements 26 through which the oven chamber 24 is vented by a conduit 132 during the period the temperature is being elevated to approximately 750° F. to 950° F. to degrade the food soils adhering to the walls of the chamber.

The circuit energizing the heating elements 42, 44 to elevate the temperature to between 750° F. to 950° F. within the oven chamber follows: power supply line L1, conductor 134, switch 66 on the contact 121, conductor 135, closed switch 91 to closed timer switch 136, conductor 137, parallel connected heating elements 42, 44, conductor 138, a non-adjustable oven control thermostat switch 140 to power line L2. The thermostat switch 140 is normally closed and opens when the temperature within the oven chamber reaches and rises above 850° F.

As it is important to control the temperature rise within the oven chamber so as not to be too rapid, each having element 42, 44 is connected in series to a cycling switch 142, 144 respectively. Each switch is thermally responsive to a respective heating element 145 to being cyclically opened and closed and each heating element is accordingly cycled. The cycling of the switches controls the heat output from the heating elements 42, 44 to provdie for a slow heat rise in the oven chamber. The heating elements 145 are connected to and placed in circuit by the switch 92 and each heating element is connected in series with the respective switch it influences to self de-energize itself upon influencing the opening of the switch.

The timer 136 terminates the operation of the heating elements 42, 44 and thereafter it is necessary that the knob 84 be manually reset from Clean to either of the other positions to open the switches 91, 92 and simultaneously reset the switch 90 upon the contact 95. The reset switch 90 with switch 64 on contact 97 sets the circuit to energize the motor to unlatch the door. The unlaching may not be immediately effected as the circuit will remain open until the oven chamber temperature has sufficiently cooled to effect a closing of the thermostat switch 70. After unlatching the door, the switches 64, 66 are both actuated, the switch 64 de-energizing the circuit to motor 54 while the switch 66 resetting on contact 120 reconnects in circuit the surface heating element 26. The heating elements are returned in circuit for control by the thermostat switch 130 and the circuit to the heater elements 145 are held open.

From the foreoing it is apparent that an automatically actuated safety door latching device is provided for the oven chamber when it is to be elevated to temperatures of 750° F.–950° F., and which requires no manual operation of levers by the user. The latching and unlatching being fully automatic requires the operator merely to preset the controller knob 84 to the use desired of the oven. To latch the door it must be fully closed otherwise the door switch 105 will maintain the circuit open and in this position either the latching device 50 will function nor will the heating elements be energized until the door has latched and the switch 66 has been actuated by the motor 54 upon the contact 121. Further the door cannot be unlatched as long as the temperature within the oven chamber is elevated above 575° F.

Though a timer 136 is shown and described as controlling the period of energization of the heating elements 42, 44 the period may be terminated by the user upon resetting the knob 84 of controller 68 from Clean to either of the other needed positions. This will open the switches 91, 92 and reset switch 90 upon 95 to set the motor circuit with switch 64 upon contact 97 to energize the motor 54 as soon as the oven chamber has cooled to below 575° F. and effected a reclosing of the thermostat switch 70.

Although a specific embodiment of this invention has been shown and disclosed, it will be appreciated that certain modifications and improvements are within the spirit and scope thereof. Accordingly such modification and improvements as are not specifically excluded by the language of the hereinafter appended claims are to be considered as inclusive thereunder.

I claim:

1. A locking device for a door of a range oven chamber, comprising a keeper affixed to said door, a latch member supported by said range for movement into and out of engagement with said keeper to lock and unlock said door when said door is closed, and electric motor coupled to a reduction drive and being connected to a driven shaft whereby said shaft is rotatable at a relatively slow speed, said driven shaft being connected to said latch member, a control circuit and a power source for said control circuit, said motor being connected in series to switching means, and thereafter to said power source, and said switching means being actuated by said drive shaft in response to the completion of each operative movement of said latch member into engagement with or disengagement from said keeper, and an alternate energization circuit connected to said switch means whereby said switch means sequentially presets said alternate circuit.

2. The latching device of claim 1 wherein said switch actuated means comprises a cam connected to said driven shaft for rotation therewith.

3. A latching device for an access door of a range oven chamber, said chamber being within the body of said range and having an access opening formed in the front wall thereof, said door carrying a gasket arranged to extend about the perimeter of said access opening and against the face of said front wall when said door is closed, said latching device comprising a keeper affixed to said door, and a latch member pivotally mounted on said body for reciprocating movement into engagement and disengagement with said keeper to lock and unlock said door when said door is closed, drive means operatively connected to said latch member, an electric motor for actuation of said drive means, a control circuit including a motor power circuit and an alternate circuit, switching means adapted upon actuation thereof to open said motor power circuit and to preset said alternate open circuit, said switching means being actuated by movement of said drive means following each movement of said engagement and disengagement of said latch member, said member including a finger directed eccentrically of the pivotal axis of said latch member and adapted to draw said door toward said front wall to compress said gasket upon engagement with said keeper.

4. A latch mechanism for locing a door of a range oven chamber, comprising a keeper and reciprocating latching member located entirely within said oven chamber, said latching member being adapted to engage and interlock said keeper in a door locking position only when said door is closed and a controller switch is in a first position, said latching member being adapted to release said keeper only when the temperature within said chamber is below a predetermined level above which food soils deposited on the wall of the said chamber are burned off and said controller switch is in a second position, control means for said latching mechanism including as the sole external control device said controller switch, and including electrical actuating means for causing reciprocation of said latching device when said controller switch is set in its first position and including a first circuit having first heating means, said first circuit being energized when said controller switch is in said first position, and said first circuit including a normally closed thermal responsive switch responsive to temperature in said chamber connected between said controller switch and said electrical actuating means to prevent release of said keeper when temperature within said chamber is above said predetermined level while permitting energization of said actuating means when said temperature is below said predetermined level, said control means also including a parallel alternate circuit, said controller switch in said first position energizing said first circuit and in said second position energizing said alternate circuit and an alternate circuit control switch thrown with each energization of said electrical actuating means to alternately energize said first circuit and said alternate circuit such that said alternate circuit is wholly energized only when said door is unlocked and said first circuit is wholly energized only when said door is locked.

5. A latch mechanism according to claim 4 wherein said electrical actuating means includes an electrical motor coupled by a translating drive to said latch member, and an actuation member coupled to said drive means operable to actuate said alternate circuit control switch to terminate each energization period of said electrical actuating means upon completion of locking or release of said door by said latching means.

6. A latching mechanism according to claim 5 wherein said actuation member comprises a cam connected to a shaft rotatably driven by said motor such that rotation of said cam in one direction alternately connects said first circuit and said alternate circuit in response to the energization of said motor.

7. A latching mechanism according to claim 6 wherein said driven shaft is linked to said latching member to cause said latch member to rotate on a pivotal axis to engage said keeper and to release said keeper, said latch member including a finger directed eccentrically of the pivotal axis of said latch member and adapted to draw said door toward said chamber to compress a gasket therebetween upon engagement with said latch member with said keeper.

8. A latching mechanism according to claim 4 wherein said first heating means includes a resistance heater operable to raise the temperature within said oven chamber to a degree such that food soils are burned from the walls of said oven chamber, and said second heating means includes a surface heating element for said range.

*9. A locking device for the door of a range oven chamber comprising a keeper affixed to the inner side*

*of said door, a latch member movably supported by said range for movement into and out of engagement with said keeper to lock and unlock said door when said door is closed, driving means carried within said range and connected to said latch member, electrically actuated means coupled to said driving means to actuate the same to move said latch member into and out of locking position, a control circuit connected to said electrically actuated means and to a power source, switching means in said control circuit arranged to be actuated by said driving means to open said control circuit during movement of said latch member into locking position, and an alternate energization circuit connected to said electrically actuated means and said power source, said switching means including a switch in said alternate circuit arranged to be closed by said driving means during movement of said latch member into locking position.*

*10. A locking device according to claim 9 including a thermally responsive switch in said alternate circuit responsive to the temperature in said oven chamber maintaining said alternate circuit open when the temperature in said oven chamber exceeds a predetermined level.*

References Cited

The following references, cited by the Examiner, are of record in the patented file of this patent or the original patent.

UNITED STATES PATENTS

| | | | |
|---|---|---|---|
| 3,189,375 | 6/1965 | Getman | 219—413 |
| 3,317,708 | 5/1967 | Bowling | 219—412 |
| 3,313,918 | 4/1967 | Barber | 219—412 |
| 3,350,542 | 10/1967 | Getman | 219—412 |
| 3,390,909 | 7/1968 | Nagel | 219—413 X |
| 3,474,226 | 10/1969 | Kauranen | 219—413 |

BERNARD A. GILHEANY, Primary Examiner

F. E. BELL, Assistant Examiner

U.S. Cl. X.R.

219—413